United States Patent
Xia et al.

(10) Patent No.: US 11,231,857 B2
(45) Date of Patent: Jan. 25, 2022

(54) METHODS, APPARATUSES AND COMPUTER PROGRAM PRODUCTS FOR PROCESSING AND MANAGING STORAGE UNIT ACCESS

(71) Applicant: EMC IP Holding Company LLC, Hopkinton, MA (US)

(72) Inventors: Sihang Xia, Beijing (CN); Zhenhua Zhao, Beijing (CN); Changyu Feng, Beijing (CN); Xinlei Xu, Beijing (CN); Xiongcheng Li, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 108 days.

(21) Appl. No.: 16/587,932

(22) Filed: Sep. 30, 2019

(65) Prior Publication Data

US 2020/0133523 A1 Apr. 30, 2020

(30) Foreign Application Priority Data

Oct. 31, 2018 (CN) .......................... 201811288671.7

(51) Int. Cl.
| | |
|---|---|
| G06F 3/06 | (2006.01) |
| G06F 21/73 | (2013.01) |
| G06F 21/62 | (2013.01) |
| G06F 21/78 | (2013.01) |
| G06F 11/14 | (2006.01) |
| G06F 12/0875 | (2016.01) |

(52) U.S. Cl.
CPC ............ *G06F 3/0622* (2013.01); *G06F 3/067* (2013.01); *G06F 3/0646* (2013.01); *G06F 3/0683* (2013.01); *G06F 21/73* (2013.01)

(58) Field of Classification Search
None
See application file for complete search history.

(56) References Cited

U.S. PATENT DOCUMENTS

| | | | |
|---|---|---|---|
| 7,941,632 B2 | 5/2011 | Karpoff et al. | |
| 9,152,550 B1 | 10/2015 | Taylor et al. | |
| 9,460,028 B1 | 10/2016 | Raizen et al. | |
| 9,639,295 B1* | 5/2017 | Natanzon | G06F 3/065 |
| 9,658,797 B1* | 5/2017 | Elliott, IV | G06F 3/067 |
| 9,778,865 B1 | 10/2017 | Srinivasan et al. | |
| 9,830,082 B1 | 11/2017 | Srinivasan et al. | |
| 9,916,202 B1 | 3/2018 | Seela et al. | |
| 9,933,957 B1 | 4/2018 | Cohen et al. | |
| 9,983,942 B1 | 5/2018 | Seela et al. | |
| 10,289,690 B1 | 5/2019 | Bono et al. | |

* cited by examiner

*Primary Examiner* — Michael Alsip
(74) *Attorney, Agent, or Firm* — BainwoodHuang

(57) ABSTRACT

Techniques process and manage a storage unit access. In accordance with such a technique, a data access request which is from a host system and for a first storage unit in the first storage system is received, wherein the first storage unit is a secondary storage unit; and the data access request is forwarded to a second storage unit in a second storage system associated with the first storage unit via a redirection link from the first storage system to the second storage system, wherein the second storage unit is a primary storage unit. Through such techniques, the host system can be allowed to send a data access request for the secondary storage unit, so that the host system does not need to resend the data access request, thereby reducing delay and interruption caused by such requests.

30 Claims, 10 Drawing Sheets

METHODS, APPARATUSES AND COMPUTER PROGRAM PRODUCTS FOR PROCESSING AND MANAGING STORAGE UNIT ACCESS

CROSS-REFERENCE TO RELATED APPLICATION

This application claims priority to Chinese Patent Application No. CN201811288671.7, on file at the China National Intellectual Property Administration (CNIPA), having a filing date of Oct. 31, 2018, and having "METHODS, APPARATUSES AN COMPUTER PROGRAM PRODUCTS FOR PROCESSING AND MANAGING STORAGE UNIT ACCESS" as a title, the contents and teachings of which are herein incorporated by reference in their entirety.

FIELD

Embodiments of the present disclosure relate to the field of data storage, and more specifically to a method, apparatus, and computer program product for processing a storage unit access in a first storage system, a method, apparatus and computer program product for processing a storage unit access in a second storage system, and a method, apparatus and computer program product for managing a storage unit access.

BACKGROUND

A storage system may be built based on one or more physical storage devices to provide the ability to store data. In particular, to prevent the loss of data or transactions, it is possible to protect the selected data by replicating the selected data from one storage system to another storage system to perform disaster recovery according to the another storage system when the storage system fails.

In the prior art, there is a data protection and disaster recovery solution called RecoverPoint. With this solution, data may be protected by replicating block storage objects. According to this solution, in addition to the local write operation, the storage system also needs to send the data to be replicated to a RecoverPoint Application (RPA) to perform the replication operation. Since data needs to be written to the local storage unit and sent to the RPA at the same time, such operation is usually referred to as splitting the write requests, and a component that performs such splitting operation is usually called an RP splitter, which may be an auto-insert driver in the storage system.

A reliable replication solution is required to provide effective data protection. The replication solutions usually used currently include asynchronous replication and synchronous replication. The synchronous replication requires that data be written and committed in real time to both a replication source unit (also referred to as a primary storage unit or main storage unit) and a replication destination unit (also referred to as a secondary storage unit, or auxiliary storage unit). The asynchronous replication does not require this real-time synchronous commit operation. The advantage of this synchronous replication lies in that it can ensure consistency between the replication source unit and the replication destination unit, thus enabling zero data loss when data recovery is required.

In the existing storage technologies, such synchronous replication is usually performed between a replication source logical unit number (LUN) unit and a replication destination LUN unit in the same storage system. When a storage system is set up, a role is assigned to the LUN unit, that is, determine whether each LUN unit is a replication source LUN or a replication destination LUN. After the device roles are assigned, their respective roles will be fixed. In subsequent operations, an input/output (I/O) request may be filed for the replication source LUN, and the I/O request for the replication destination LUN will be rejected by the storage system and the I/O request needs to be resent by the host system. In this case, delay or even interruption of the I/O request will occur, and the host system will also need to bear the burden of resending the I/O request.

SUMMARY

In embodiments of the present disclosure, there is provided a technical solution for failure recovery of a storage system.

In a first aspect of the present disclosure, there is provided a method for processing a storage unit access in a first storage system. The method includes receiving a data access request which is from a host system and for a first storage unit in the first storage system, wherein the first storage unit is a secondary storage unit; and the data access request is forwarded to a second storage unit in a second storage system associated with the first storage unit via a redirection link from the first storage system to the second storage system, wherein the second storage unit is a primary storage unit.

In a second aspect of the present disclosure, there is provided a method for processing a data access request in a second storage system. The method includes receiving a data access request forwarded by a first storage system via a redirection link from the first storage system to the second storage system, wherein the data access request is for a first storage unit in the first storage system, and wherein the first storage unit is a secondary storage unit; and the data access request is processed by a second storage unit in the second storage system associated with the first storage unit, the second storage unit being a primary storage unit.

In a third aspect of the present disclosure, there is provided a method for managing a storage unit access. The method includes: transmitting a data access request to a first storage unit in a first storage system, wherein the first storage unit is a secondary storage unit, and wherein the data access request is forwarded to a second storage unit in a second storage system associated with the first storage unit via a redirection link from the first storage system to the second storage system, the second storage unit being a primary storage unit; and receiving an acknowledgment for the data access request from the first storage system.

In a fourth aspect of the present disclosure, there is provided an apparatus for processing a storage unit access in a first storage system. The apparatus includes: a processor; and a memory coupled to the processor, the memory having instructions stored therein, the instructions, when executed by a processor, causing the apparatus to perform acts in the method according to the first aspect of the present disclosure.

In a fifth aspect of the present disclosure, there is provided an apparatus for processing a storage unit access in a second storage system. The apparatus includes: a processor; and a memory coupled to the processor, the memory having instructions stored therein, the instructions, when executed by the processor, causing the apparatus to perform acts in the method according to the second aspect of the present disclosure.

In a sixth aspect of the present disclosure, there is provided an apparatus for managing a storage unit access. The apparatus includes: a processor; and a memory coupled to the processor, the memory having instructions stored therein, the instructions, when executed by the processor, causing the apparatus to perform acts in the method according to the third aspect of the present disclosure.

In a seventh aspect of the present disclosure, there is provided a computer program product tangibly stored on a computer readable medium and including machine executable instructions, the machine executable instructions, when executed, causing a machine to perform acts in the method according to the first aspect of the present disclosure.

In an eighth aspect of the present disclosure, there is provided a computer program product tangibly stored on a computer readable medium and including machine executable instructions, the machine executable instructions, when executed, causing a machine to perform acts in the method according to the second aspect of the present disclosure.

In a ninth aspect of the present disclosure, there is provided a computer program product tangibly stored on a computer readable medium and including machine executable instructions, the machine executable instructions, when executed, causing a machine to perform acts in the method according to the third aspect of the present disclosure.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The above and other objectives, features, and advantages of example embodiments of the present disclosure will become more apparent from the following detailed description with reference to the accompanying drawings, in which the same reference symbols refer to the same elements in example embodiments of the present disclosure.

DETAILED DESCRIPTION OF EMBODIMENTS

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

The principles of the present disclosure are described below with reference to several example embodiments illustrated in the figures. Although preferred embodiments of the present disclosure are shown in the figures, it should be appreciated that these embodiments are described only to enable those skilled in the art to better understand and thereby implement the present disclosure, not to limit the scope of the present disclosure in any manner.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The term "one example implementation" and "an example implementation" are to be read as "at least one example implementation." The term "another implementation" is to be read as "at least one other implementation." Terms "a first", "a second"

and others can denote different or identical objects. The following text may also contain other explicit or implicit definitions.

Figure 1:
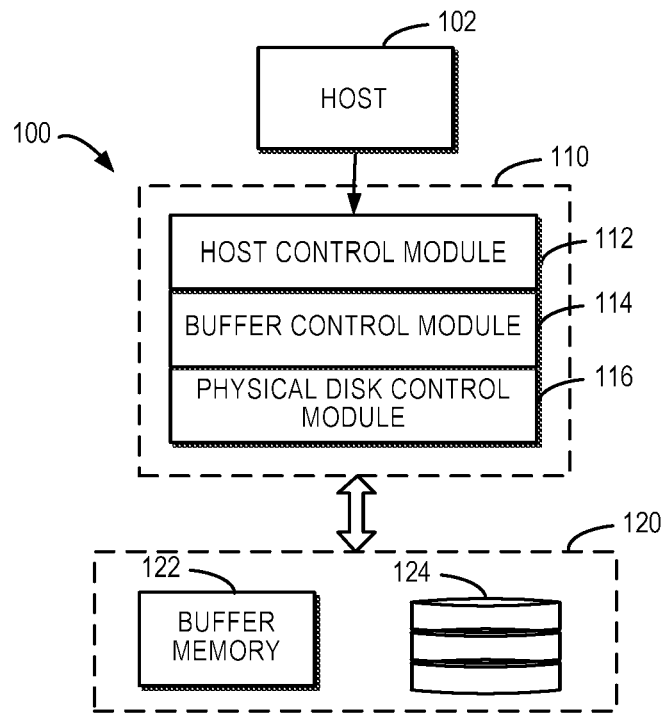
FIG. 1 illustrates a schematic diagram of an example environment in which embodiments of the present disclosure may be implemented.

Reference is first made to FIG. 1, which shows a schematic diagram of an example environment in which the technical solutions of embodiments of the present disclosure may be implemented. The storage system 100 includes a physical storage device group 120 for providing a data storage capability. The physical storage device group 120 includes a buffer memory 122 and a disk device 124. The buffer memory 122 is used for data buffering, and the disk device 124 is used for persistent storage of data. Generally, an access speed of the buffer memory 122 is greater than that of the hard disk device 124. The storage system 100 may utilize a variety of storage technologies to provide the data storage capability.

In some embodiments, examples of the buffer memory 122 include memories having a higher access speed, such as caches, random access memory (RAM), and dynamic random access memory (DRAM). Examples of the disk device 124 may include Redundant Arrays of Independent Drives (RAID) or other disk devices.

To manage data storage for physical storage space, the storage system 100 further includes a storage controller 110. Usually, the storage system 100 employs a hierarchical control model. As shown in FIG. 1, under the hierarchical control model, the storage controller 110 may have multiple layers of control modules, including a host control module 112, a buffer control module 114, and a physical disk control module 116. These control modules implement hierarchical control functions.

To facilitate understanding of the hierarchical control model of the storage system 100, a working mechanism of the controller 110 is described in an example using the RAID technology. The physical disk control module 116 presents a RAID logical unit number (LUN) to the buffer control module 114. The physical disk control module 116 controls the storage space of the disk device 124. The buffer control module 114 controls the buffer space of the buffer memory 122 to present a buffer volume to the host control module 112. The host control module 112 manages a logical storage pool and presents the pool LUN to the host 102.

Upon operation, the host 102, for example an application running on the host 102, sends a user write request to the host control module 112 to request that data be written to the storage system 100. In response to the received user write request, the host control module 112 may generate multiple write requests for the buffer control module 114. For example, if the host 102's user write request requires writing a large amount of data into multiple discrete segments of a RAID LUN created by the hard disk device 124, the host control module 112 sends a write request to the buffer control module 114 for each segment.

The buffer control module 114 and the buffer memory 122 operate in a write back mode. This means that upon receipt of the write request, the buffer control module 114 first buffers the data to be written by the write request to the buffer memory 122 and then releases the data of the write request(s) to the disk device 140. The buffer control module 114 may send an indication of completion of the write request to the host control module 112 after the data buffer is completed, thereby achieving a fast response to the user write request. The physical disk control module 116 is used to control an actual write to the hard disk device 124.

It should be understood that although illustrated above as different modules, the host control module 112, the buffer control module 114 and the physical disk control module 116 may be implemented by a single or multiple processors, controllers, microprocessors having a processing capability or a computing device including these devices. In some examples, the buffer control module 114 may further be integrated with the buffer memory 122 to obtain a device which simultaneously has buffering and controlling capabilities. Although not shown, in some embodiments, the storage system 100 may further include another storage controller serving as a mirror of the storage controller 100 to provide data consistency, security, and data recovery capability. In some examples, the storage system 100 may also use a multi-core storage mechanism to implement data storage and management.

Figure 2:
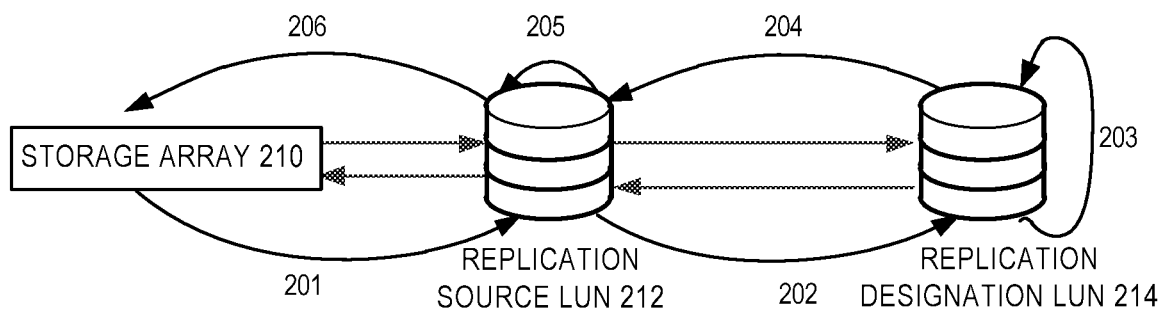
FIG. 2 illustrates an example write operation process based on synchronous replication in the prior art.

Next, reference will be made to FIG. 2 to describe an example write operation process based on synchronous replication in the prior art. As shown in FIG. 2, the host system sends a write request to the replication source LUN 212 through a storage array 210 (operation 201), and then the write I/O is mirrored to the replication destination LUN 214 (operation 202). Next, the mirror write I/O operation is committed at the replication destination LUN 214 (operation 203). After the operation is successful, the replication destination LUN 214 confirms to the replication source LUN 212 that the write I/O operation has been successfully performed at the replication destination LUN 214 (operation 204). In response to this, a write I/O operation is committed to the replication source LUN 212 (operation 205). When the write I/O operation at the replication source LUN 212 is also completed, the replication source LUN 212 returns an acknowledgment of the write I/O operation to the host system via the storage array 210 (operation 206). This process is repeated for each I/O request requested by the host system through the storage array 210.

As described above, in the existing storage technology, when a storage system is established, a role is assigned to a LUN participating the synchronous replication, that is, determine whether each LUN is the replication source LUN or the replication destination LUN. After the role assignment of the storage units is completed, their respective roles will be fixed. In subsequent operations, an I/O request may be filed for the replication source LUN without allowing the I/O request to be sent directly to the replication destination LUN, and any I/O request to the replication destination LUN will be rejected by the storage system. Therefore, in this case, the host system needs to retry the I/O request to send it to the replication source LUN. At this time, for such an I/O request to the replication destination LUN, the host system will experience delay or even interruption of the I/O request, and the burden of resending the I/O request is also borne by the host system.

To this end, a technical solution for processing storage unit access is provided in the present disclosure. In this solution, in the case that a secondary storage unit as the replication destination unit receives from the storage unit a data access request sent by the host system, it does not reject the data access request, but forwards the data access request to a primary storage unit serving as the replication source unit via a redirection link between the storage system to which the two storage units belong. In this way, the host system does not need to resend the data access request, and thereby may reduce the likelihood that the host system experiences delay or even interruption of the I/O request.

Hereinafter, embodiments of the present disclosure will be described in detail with reference to FIGS. 3 through 16. However, it needs to be appreciated that the figures and embodiments shown therein are presented for illustration purpose, and the present disclosure is not limited to the details shown therein. On the contrary, the present disclosure may be implemented without using these details without departing from the ideas and spirit of the present disclosure, or various variations may be made to the present disclosure.

Figure 3:
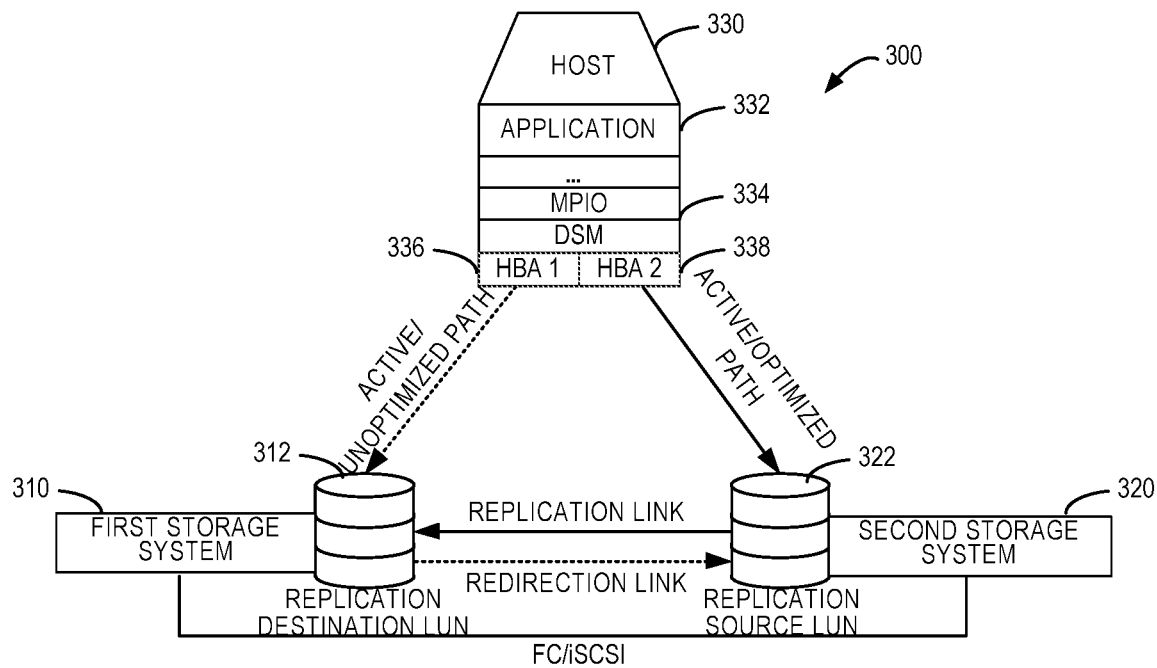
FIG. 3 schematically illustrates a synchronous replication-based storage system architecture in accordance with an embodiment of the present disclosure.

FIG. 3 schematically illustrates a synchronous replication-based storage system architecture in accordance with an embodiment of the present disclosure. As shown in FIG. 3, the storage system architecture 300 includes a first storage system 310 and a second storage system 320. The first storage system 310 includes a secondary storage unit as the replication destination LUN 312, and the second storage system 320 includes a primary storage unit as the replication source LUN 322. The first storage system 310 and the second storage system 320 are interconnected for example by an optical fiber cable (FC) or Internet Small Computer System Interface (iSCSI) to provide a replication link from the replication source LUN to the replication destination LUN and a redirection link from the replication destination LUN to the replication source LUN. A path between the host system 330 and the replication source LUN 322 may be referred to as an optimized path, which is active in a normal state. A path between the host system 330 and the replication destination LUN 312 may be referred to as a non-optimized path, which is also active in the normal state. In addition, the host system 330 runs various user applications 332, and also includes a multi-path I/O (MPIO) module, a device specific module (DSM), and host bus adapters HBA1 336 and HBA2 338 for communication with first storage system 310 and second storage system 320, respectively.

The host system 330 may send an I/O request to the replication source LUN 322 through an active/optimized path between the host 330 and the replication source LUN 322. The I/O request may be processed for example in a similar manner to FIG. 2, but such replication is not performed between two storage units of the same storage system, but between two storage units in different storage systems. Specifically, the second storage system 320 to which the replication source LUN 322 belongs serves the I/O request, and the I/O request is replicated to the first storage system 310 via a replication link between the first storage system 310 and the second storage system 320. The first storage system 310 commits the I/O request to the replication destination LUN 312. After the I/O request of the replication destination LUN 312 is successfully processed, an acknowledgement is sent back to the second storage system 320 by the first storage system 310. In response to the acknowledgment, an I/O request is committed to the replication source LUN 322, and after the operation succeeds, an acknowledgment for the I/O request is returned to the host system 330 via the second storage system 320, indicating completion of the requested I/O operation.

In particular, the host system 330 may also send an I/O request to replication destination LUN 312 through an active/optimized path between the host system 330 and replication destination LUN 312. This situation may occur for example for a reason such as MPIO/DSM load balancing. After the first storage system 310 to which the replication destination LUN 312 belongs receives the I/O request, it does not directly reject the request as in the prior art, but sends, forwards, or redirects the I/O request to the second storage system 320 to which the replication source LUN 322 belongs via the redirection link between the first storage system 310 and the second storage system 320, so that the I/O request is processed by the replication source LUN 322. The processing of the I/O request is substantially similar to the I/O request that directly comes from the host system 330. The difference lies in that after the I/O request processing at the replication source LUN 322 is completed, the acknowledgment may be returned to the first storage system 310, and then the replication destination LUN 312 forwards the acknowledgment to the host system 330, instead of directly returning confirmation for the I/O request to the host system 330 via the second storage system 320. An advantage of such an acknowledgment transmission manner is that such redirection operation will be transparent to the host system. Moreover, with such I/O redirection, the host system 330 does not need to resend the I/O request, and thereby may reduce the likelihood that the host system will experience delay or even interruption of the I/O request.

Figure 4:
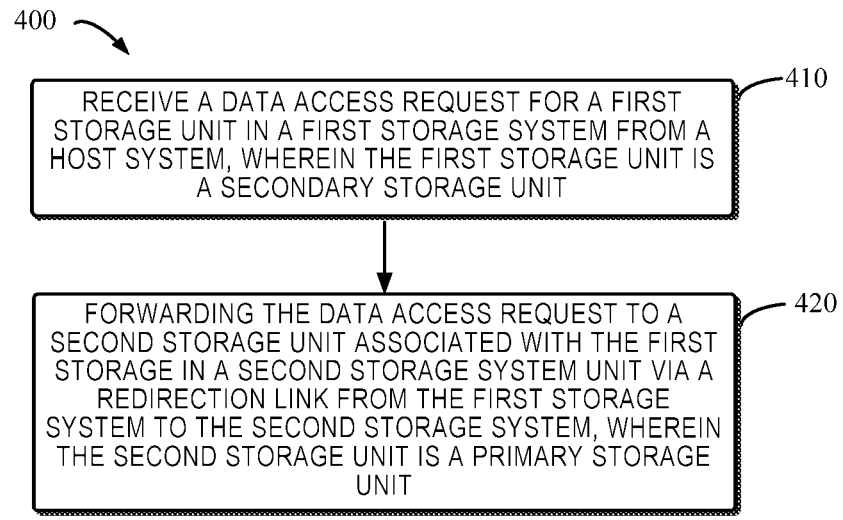
FIG. 4 illustrates a flow chart of a method 400 for processing storage unit access according to an embodiment of the present disclosure.

FIG. 4 illustrates a flow chart of a method 400 for processing storage unit access in accordance with an embodiment of the present disclosure. The operation of method 400, or at least a portion thereof, may be implemented by a control device/controller of the storage system, particularly by a control module in a storage system that includes a secondary storage unit as the replication destination LUN.

At block 410, a data access request for a first storage unit in the first storage system is received from a host system, wherein the first storage unit is a secondary storage unit. In other words, the first storage system receives a data access request for the secondary storage unit from the host system.

Next, at block 420, the data access request is forwarded to a second storage unit in the second storage system associated with the first storage unit via a redirection link from the first storage system to the second storage system, wherein the second storage unit is a primary storage unit. As described with reference to FIG. 3, the first storage system and the second storage system may be physically connected by FC or iSCSI. The physical connection may provide the redirection link from the first storage system to the second storage system in addition to providing a replication link from the second storage system to the first storage system. Via the redirection link, the data access request for the first storage unit may be forwarded to a second storage unit in the second storage system. Therefore, in an embodiment of the present disclosure, the data access request for the storage unit from the host system is not directly rejected, but forwarded to the primary storage unit for processing. As such, this does not require the host system to retry data access request, thereby not causing delay or interruption of data access request.

According to the some embodiments of the present invention, in order to perform the redirection, it is possible to consider introducing a new proxy driver in a host-side driver stack in the first storage system, the redirection being performed by the proxy driver. The proxy driver may be an auto-insert drive that may be included in the driver stack for each secondary storage unit. The proxy driver may be configured to intercept all I/O requests for respective secondary storage units from the host system, and redirect them to respective primary storage units in another storage system via the redirection link.

Figure 5:
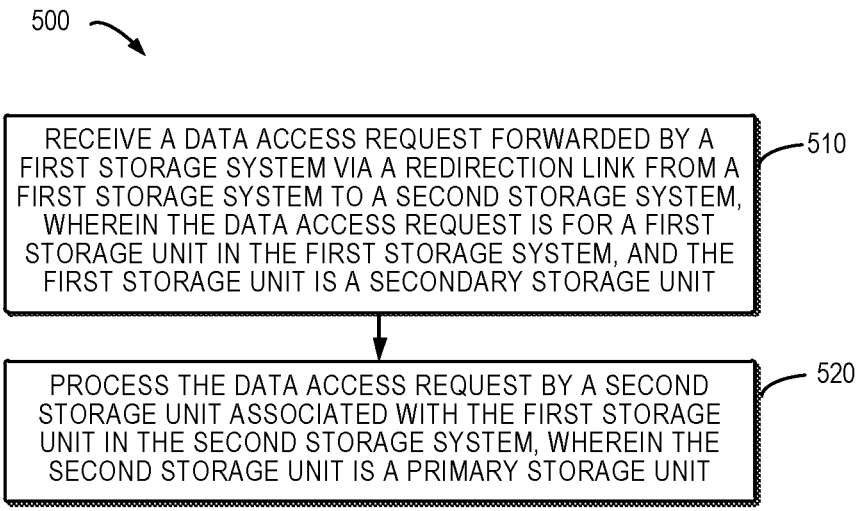
FIG. 5 illustrates a flow chart of a method 500 for processing storage unit access according to another embodiment of the present disclosure.

FIG. 5 illustrates a flow chart of a method 500 for processing storage unit access according to an embodiment of the present disclosure. The operation of method 500, or at least a portion thereof, may be implemented by a control device/controller of the storage system, particularly by a control module in a storage system that includes a primary storage unit as a replication source LUN.

At block 510 is received a data access request forwarded by the first storage system via a redirection link from the first storage system to the second storage system, wherein the data access request is for a first storage unit in the first storage system, and the first storage unit is a secondary storage unit. In an embodiment of the present disclosure, a data access request for the secondary storage unit is forwarded to the primary storage unit via the redirection link, rather than directly rejecting the host system's data access request for the secondary storage unit. As such, this does not require the host system to retry data access request, thereby not causing delay or interruption of data access request.

Next, at block 510, the data access request is processed by a second storage unit associated with the first storage unit in the second storage system, the second storage unit being a primary storage unit. After the forwarded data access request for the secondary storage unit is received, the data access request will be processed by the second storage unit.

The processing of the data access request is substantially similar to or the same as the processing of the data access request of the host system directly for the second storage unit, but the return of the acknowledgment for the I/O access request is different. Specifically, after the data access request processing at the second storage unit is completed, the acknowledgement may be returned to the first storage unit of the first storage system as the secondary storage unit, and then the first storage unit forwards the acknowledgement to the host system, rather than the second storage system 310 directly returning the acknowledgment for the data access request to the host system 330. An advantage of such an acknowledgment transmission manner is that such redirection operation will be transparent to the host system. Moreover, with such I/O redirection, the host system 330 does not need to resend the I/O request, and thereby may reduce the likelihood that the host system will experience delay or even interruption of the I/O request.

In some embodiments according to the present disclosure, after the forwarded write I/O request is received, the RP splitter in the second storage device replicates the write I/O request to the first storage unit in the first storage system via the replication link between the second storage system and the first storage system, then commits the replicated write I/O operation to the first storage unit. After the execution is successful, an acknowledgement is made to the second storage unit that the write I/O operation has been successfully performed at the first storage unit. In response to this, the write I/O operation is performed at the second storage unit. After the write I/O operation at the second storage unit is also completed, the acknowledgement request is returned to the first storage unit in the first storage system, and the acknowledgement is forwarded to the host system by the first storage unit.

Figure 6:
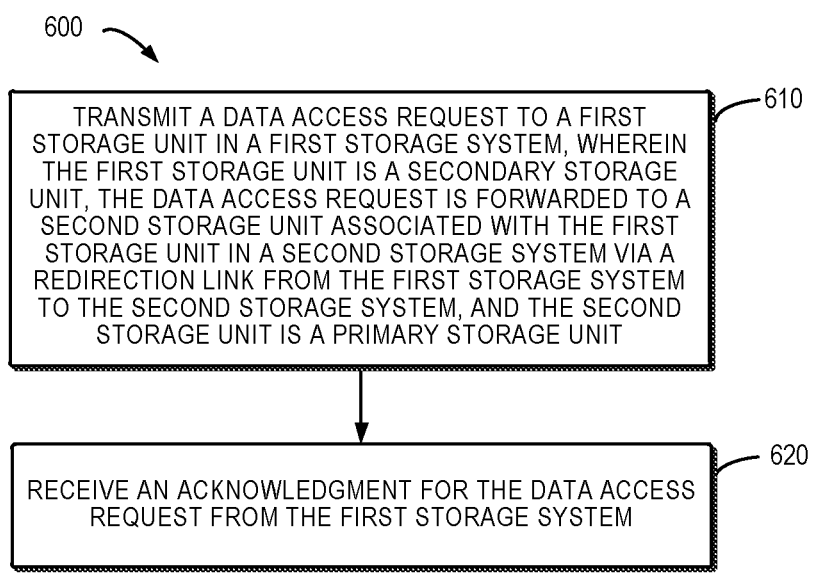
FIG. 6 illustrates a flow chart of a method 600 for managing storage unit access according to another embodiment of the present disclosure.

FIG. 6 illustrates a flow chart of a method 600 for managing storage unit access according to an embodiment of the present disclosure. The operation of method 600, or at least a portion thereof, may be implemented by a control device/controller in the host system.

At block 610, the host system sends a data access request to a first storage unit located in the first storage system, wherein the first storage unit is a secondary storage unit. As previously described with reference to FIG. 4, the data access request will be sent to a second primary storage unit associated with the first storage unit in the second storage system via a redirection link from the first storage system to the second storage system.

At step 620, the acknowledgment for the data access request is received from the first storage system. After the second storage system receives the forwarded data access request for the secondary storage unit, the data access request will be processed by the second storage unit. Upon completion of the processing, an acknowledgment for the data access request will be sent by the second storage unit to the first storage unit of the first storage system via the second storage system. Further, the acknowledgement is sent by the first storage unit to the host system. From the perspective of the host system, it sends a data access request to the first storage unit and receives an acknowledgment for the data access request from the first storage unit, and it does not find that the data access request is redirected from the first storage unit to the second storage unit, that is, the redirection operation will be transparent to the host system.

Thus, in the embodiment of the present disclosure, the data access request for the storage unit is not directly rejected. As such, the host system does not need to retry the data access request, thereby not causing delay or interruption of the data access request.

In an embodiment according to the present disclosure, data replication is performed across different storage systems. Different storage systems have different storage unit identifications, so it is necessary to make the host aware of association between the primary storage unit and the secondary storage unit. This association may be established manually in the host system, but it is more desirable if such associations can be established automatically, particularly in a case that the association needs to be established for a number of storage units.

Figure 7:
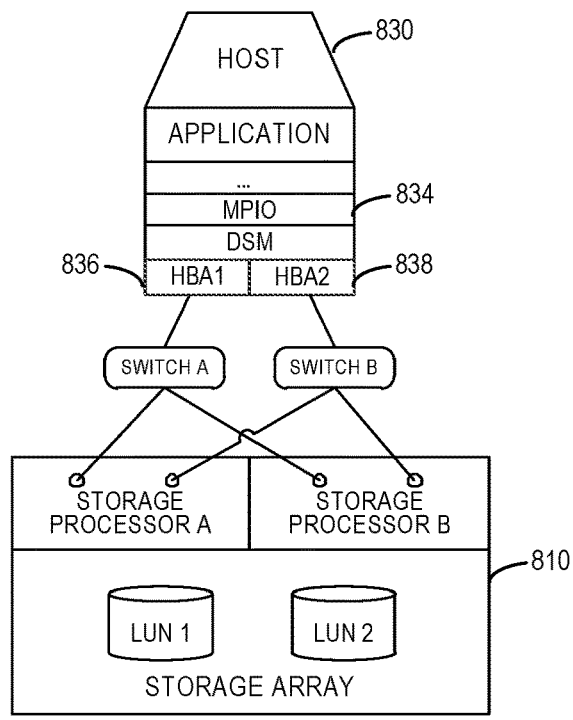
FIG. 7 illustrates a schematic diagram of using a multi-path input/output (MPIO) technology to identify two storage units in a single storage system as a single storage unit in the prior art.

FIG. 7 illustrates a schematic diagram of using MPIO to identify separate storage units displayed by different paths in a single storage system as the same storage unit in the prior art. As shown in FIG. 7, a storage array 710 includes two storage processors, namely, storage processor A and storage processor B, each storage processor has two ports connected to HBA1 836 and HBA2 838 in the host 830 via switch A and switch B. Therefore, there are four paths between the host system 730 and LUN 1 or LUN 2. That is, the host system may access one LUN of the host system via four paths. In the absence of MPIO, these four paths will be interpreted by the host system as four LUNs. Although there are four paths, since the four paths actually involve the same LUN of the same storage array, the device identification information of the LUNs to which the four paths lead is the same. Thus, with MPIO, four paths may be interpreted as leading to the same LUN based on the device identification information of the LUN.

Figure 8:
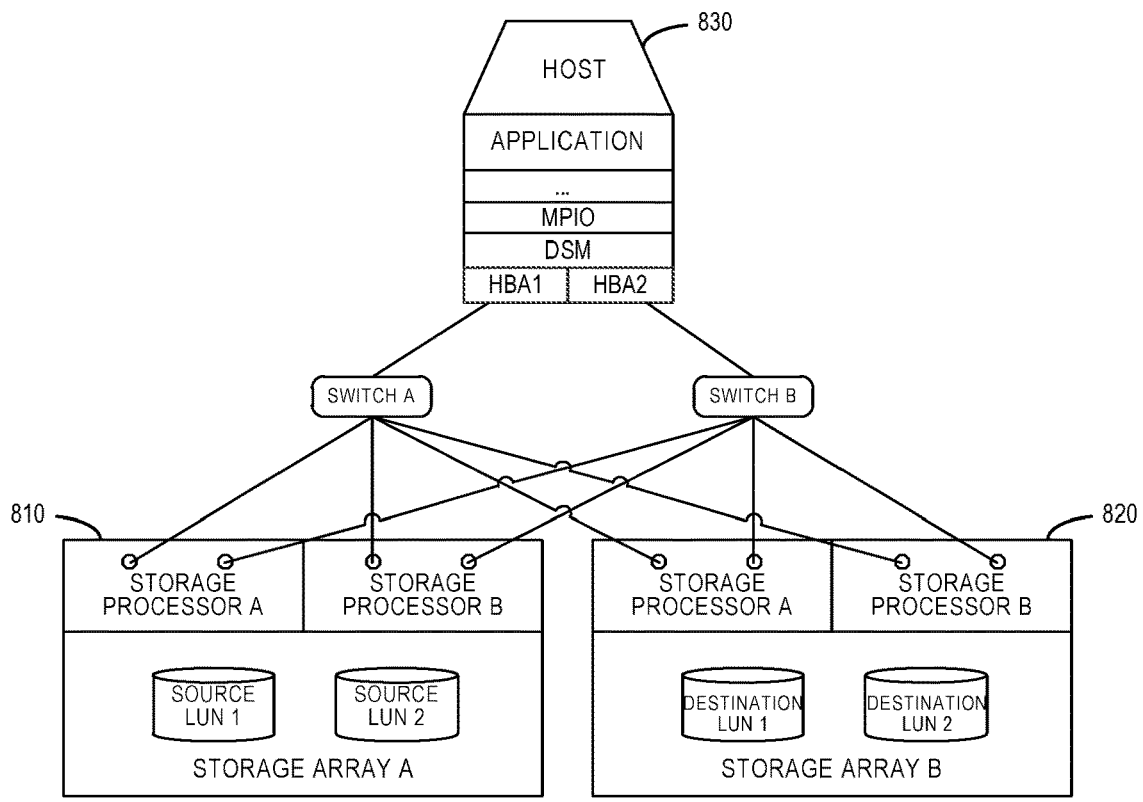
FIG. 8 illustrates a schematic diagram of using MPIO to identify two storage units respectively located in two storage systems.

However, in the case of across-array (across-storage system) replication of the present disclosure, replication may be performed between different storage arrays. FIG. 8 illustrates a schematic diagram of using MPIO to identify two storage units respectively located in two storage systems. In the case shown in FIG. 8, the host system detects 8 different paths for each replication pair including the replication source LUN and the replication destination LUN. Different from what is shown in FIG. 7, in the scenario of FIG. 8, the replication source LUN and the replication destination LUN are different LUNs based on different storage arrays, that is, their device identification information will be different. In this way, MPIO cannot place them under the same multipath group based on existing mechanisms. Therefore, MPIO cannot automatically understand the concept of duplication pair, and the storage array cannot automatically provide relevant information to MPIO. To this end, a new solution is needed to enable the host system to automatically identify the paths to the replication source LUN and the replication destination LUN and group them together.

According to an embodiment of the present disclosure, the host system sends a replication identification information acquisition request for respective storage units in the storage system, and the primary storage unit and the secondary storage unit send respective responses for the replication identification information acquisition request to indicate whether it is the primary storage unit or secondary storage unit. This is possible because during the phase of establishing the replication system of the storage system, a replication manager will create a secondary storage unit as a replication destination LUN for the storage unit and provide it with device identification information of the primary storage unit as the replication source LUN associated with it. In this way, the device identification information of the primary storage unit associated therewith may be sent from the storage unit as a response, so the host system may use the device identification information of the primary storage unit in the response to identify the secondary storage unit by. As for the primary storage unit, it may send predetermined replication identification information (e.g., all-zero identification information, or other predetermined replication identification information) to indicate that it is the primary storage unit. Regarding the device identification information of the primary storage device, the host system may obtain it by using another device identification acquisition request after receiving the response. However, it needs to be appreciated that although the present disclosure will mainly describe an embodiment in which the host first sends the replication identification acquisition request and then sends the device identification acquisition request after receiving the response, the present disclosure is not limited thereto. In other embodiments, the host system may also first send the device identification acquisition request to the storage unit in the storage system, and then send the replication identification information acquisition request.

Figure 9:
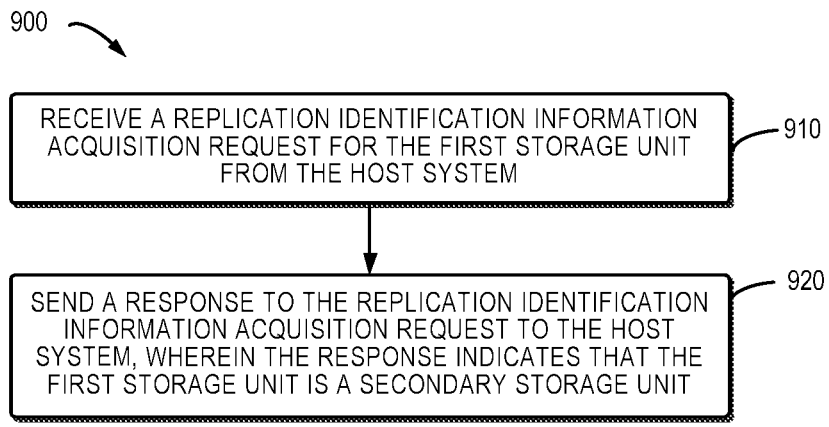
FIG. 9 illustrates a flow chart of a method 900 for providing replication identification information from a storage unit according to an embodiment of the present disclosure.

FIG. 9 illustrates a flow chart of a method 900 for providing replication identification information from a storage unit according to one embodiment of the present disclosure. The operation of method 900, or at least a portion thereof, may be implemented by a control device/controller of a storage system, particularly by a control module in a storage system that includes a secondary storage unit as a replication destination LUN.

As shown in FIG. 9, at block 910 is received a replication identification information acquisition request which is from the host system and for the first storage unit. Then, at block 920, a response to the replication information acquisition request is forwarded to the host system, wherein the response indicates that the first storage unit is a secondary storage unit. In another embodiment, upon receiving the replication identification information acquisition request, it is possible to first determine whether the storage unit is a primary storage unit or a secondary storage unit; and in response to determining that the storage unit is the secondary storage unit, sends the host system a response to the replication identification information acquisition request. This means that only functionality related to transmission of the replication identification information of the secondary storage system may exist or be activated in the first storage system, or it is also possible that functionality related to transmission of the replication identification information of both the secondary storage system and the primary storage system simultaneously exists and how to respond is determined by judging the type of the storage unit.

In an embodiment of the present disclosure, the response includes device identification information of the primary storage unit associated with the secondary storage unit, such that the host system may use the device identification information of the primary storage unit in the response to identify the secondary storage unit, thereby identifying the secondary storage unit and primary storage unit group as a replication pair.

Figure 10:
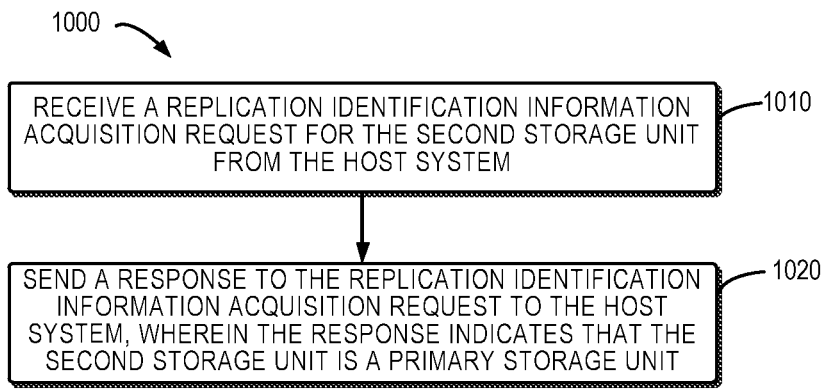
FIG. 10 illustrates a flow chart of a method 1000 for providing replication identification information at a primary storage unit according to an embodiment of the present disclosure.

FIG. 10 illustrates a flow chart of a method 1000 for providing replication identification information at a primary storage unit according to an embodiment of the present disclosure. The operation of method 1000, or at least a portion thereof, may be implemented by a control device/controller of a storage system, particularly by a control module in the storage system that includes a primary storage unit as a replication source LUN.

As shown in FIG. 10, at block 1010 is received a replication identification information acquisition request for the second storage unit from the host system. Then at block 1020, a response to the replication information acquisition request is sent to the host system to indicate that the second storage unit is a primary storage unit. According to an embodiment of the present disclosure, upon receiving the replication identification information acquisition request, it is possible to first determine whether the second storage unit is a primary storage unit or a secondary storage unit, and in response to determining that the second storage unit is a primary a storage unit, send the response to the host system. This means that only functionality related to transmission of the replication identification information of the primary storage system may exist or be activated in the secondary storage system, or it is also possible that functionality related to transmission of the replication identification information of both the secondary storage system and the primary storage system simultaneously exists and how to respond is determined by judging the type of the storage unit.

In an embodiment according to the present disclosure, the response includes predetermined replication identification information, such as all-zero replication identification information, to indicate that the new storage unit is a primary storage unit. Of course, the predetermined replication identification information may also be other predetermined replication identification information so long as the host system may recognize. In addition, other information may also be included in the response to indicate that the second storage unit is a primary storage unit. Further, the second storage unit may further receive a device identification information acquisition request from the host system, and send device identification information of the second storage unit to the host system.

Figure 11:
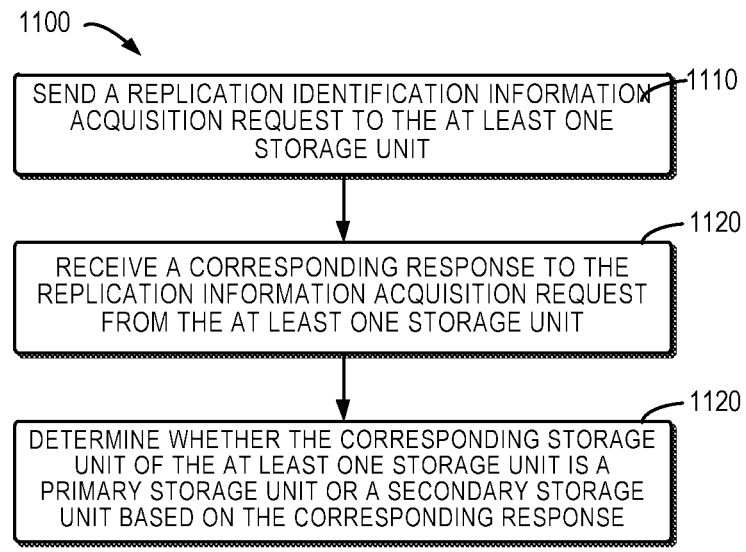
FIG. 11 shows a flow chart of a method 1100 for identifying a replication pair including a primary storage unit and a secondary storage unit at a host system according to an embodiment of the present disclosure.

FIG. 11 illustrates a flow chart of a method 1100 for identifying a replication pair including a primary storage unit and a secondary storage unit at a host system in accordance with an embodiment of the present disclosure. The operation of the method 1100, or at least a portion thereof, may be implemented by a control device/controller in the host system.

As shown in FIG. 11, in response to detecting that at least one of the first storage unit of the first storage system and the second storage unit of the second storage system is present, at block 1010, a replication identification information acquisition request is sent to the at least one storage unit. Then, at block 1020 is received a corresponding response which is to the replication information acquisition request and from the at least one storage unit. Next at block 1030, whether the at least one storage unit is a primary storage unit or a secondary storage unit is identified based on the corresponding response.

According to an embodiment of the present disclosure, whether the at least one storage unit is a primary storage unit or a secondary storage unit is identified by determining whether the response includes predetermined replication identification information upon receiving the replication identification information acquisition request. The predetermined replication identification information indicates that the corresponding storage unit is a primary storage unit.

In an embodiment according to the present disclosure, in response to identify that the corresponding storage unit is a secondary storage unit, the device identification information included in the response is associated with the corresponding storage unit. In another embodiment according to the present disclosure, it is possible to, in response to identifying that the corresponding storage unit is a primary storage unit, transmit a device identification information acquisition request to the corresponding storage unit, and receive a response which comes from the corresponding storage unit and includes the device identification information.

According to a further embodiment of the present disclosure, it is possible to further determine whether the device identification information indicates a known storage unit. In response to determining that the device identification information indicates a known storage unit, the at least one storage unit is associated with information of the known storage unit indicated by the device identification information. On the other hand, new storage unit information is established in response to determining that the device identification information does not indicate the known storage unit.

It should be appreciated that although the discovery process of the first storage unit and the second storage unit is described with reference to FIG. 10, the same operation may be performed for other newly-discovered storage units.

In some embodiments according to the disclosure, when a new multipath device of the LUN occurs, the host/MPIO will create a corresponding pseudo device/pseudo path and determine a matching device specific module DSM to process the multipath device. The DSM is a device-specific module because the command and response used to obtain the replication identifications are not included in the existing storage system commands, but are newly added for the purpose of the present invention, so different device providers may employ different command forms. To this end, it is possible to use a DSM to process it. However, if the replication identification acquisition request and the response are included in an existing system command as a standard, it is unnecessary to employ the DSM module.

Figure 12:
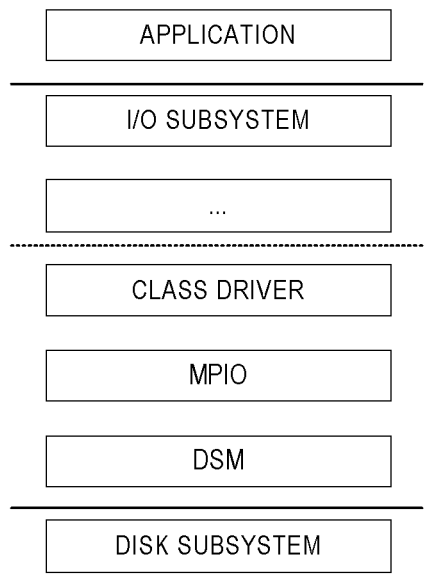
FIG. 12 illustrates a driver stack having an MPIO and a device specific module (DSM) in a host system in accordance with an embodiment of the present disclosure.

The DSM may determine whether the multipath device is a new installation unit or a storage unit that was previously installed but is now visible through another path. For purpose of illustration, FIG. 12 illustrates a driver stack having an MPIO and a DSM in a host system in accordance with an embodiment of the present disclosure. As shown in FIG. 12, an I/O request from the application will flow down to the MPIO and the vendor-based DSM through the I/O subsystem. The MPIO will identify the path to the replication source LUN and the replication destination LUN as the replication pair to the storage unit. The DSM will process the I/O request and send it via a different network interface card (NIC) or HBA via a different I/O path.

As previously mentioned, in order to identify the replication pair of the storage unit, the host system needs to send the replication identification information acquisition request to obtain information associated with the replication from the replication destination LUN, thereby providing seamless accessibility to the host system. In an embodiment of the present disclosure, a SCSI INQUIRY command is proposed to obtain the information needed to establish a pseudo device/pseudo path. The INQUIRY command and response are described below by way of embodiments.

Replication Identification VPD Pane

This SCSI INQUIRY command may be a new vendor-specific replication identification key product data (VPD) page. Examples of replication-related information that may be included in the replication identification VPD page include a volume ID, a volume name, a platform-specific MPIO/DSM identifier, and the like. These information may be obtained by setting an EVPD bit to 1 and setting a page code set to for example a new INQUIRY command for the replication identification. However, it should be noted that the page code may also be any other suitable code.

For purpose of illustration only, an example duplicate identification VPD page is shown in Table 1.

TABLE 1

| | Replication Identification VPD page | | | | | | | |
|---|---|---|---|---|---|---|---|---|
| | Bit | | | | | | | |
| Byte | 7 | 6 | 5 | 4 | 3 | 2 | 1 | 0 |
| 0 | PERIPHERAL QUALIFIER | | | PERIPHERAL DEVICE TYPE | | | | |
| 1 | PAGE CODE (0xC7) | | | | | | | |
| 2 | (MSB) | | PAGE LENGTH (n − 3) | | | | | |
| 3 | | | | | | | | (LSB) |
| 4 | Designation descriptor list Designation descriptor (first) | | | | | | | |
| . | | | | | | | | |
| n | Designation descriptor (last) | | | | | | | |

In Table 1: the PERIPHERAL QUALIFIER field and the PERIPHERAL DEVICE TYPE field are the same as the PERIPHERAL QUALIFIER field and the PERIPHERAL DEVICE TYPE field defined for standard INQUIRY data in SPC-4; the PAGE CODE field identifies the VPD page and shall be set to a code corresponding to the VPD page such as 0 × C7 for the Replication Identification VPD page; the PAGE LENGTH field indicates the length in bytes of the VPD parameters that follow this field;

the designation descriptor in the designation descriptor list contains replication source LUN's identification and platform-specific MPIO modules' designators.

Example designation descriptors are shown in Table 2.

TABLE 2

| | Designation descriptor | | | | | | | |
|---|---|---|---|---|---|---|---|---|
| | Bit | | | | | | | |
| Byte | 7 | 6 | 5 | 4 | 3 | 2 | 1 | 0 |
| 0 | Reserved | | | | DESIGNATOR TYPE | | | |
| 1 | DESIGNATOR LENGTH (n − 1) | | | | | | | |
| 2 n | DESIGNATOR | | | | | | | |

In addition, Table 3 further defines possible designators based on platform-specific MPIO components.

TABLE 3

| Definitions of Designators | | | |
|---|---|---|---|
| Type Name | Type Code | Max Length | Description |
| Source LUN Designator | 0x1 | 16 bytes | Source LUN's designator (type: 0x3, NAA-6) from VPD page 0x83 |
| Source LUN Name | 0x2 | 64 bytes | Optional |
| T10 Vendor Identification | 0x3 | 8 bytes | Optional |
| Product Identification | 0x4 | 16 bytes | Optional |

Reporting Replication Source LUN Designator

In a storage system, host-side drivers are present in a control module or control device for a storage unit to provide SCSI termination. The host-side drivers may be located between the miniport drivers and each data path driver stack, which may expose each LUN to the host/MPIO. To adapt for processing SCSI INQUIRY commands from the host system to provide replication identification VPD page 0xC7, the host side in the storage system may be configured to perform the following functions.

After the host-side driver receives the SCSI INQUIRY command for replication identification information, If the LUN being queried is the replication source LUN, the replication identification VPD page 0xC7 will be filled with an all-zero designation descriptor, or a null descriptor;

If the LUN being queried is the replication destination LUN, the replication identification VPD page 0xC7 will be filled with a designator (type: 0x1) of the replication source LUN associated with the replication destination LUN, along with an optional Source LUN Name, Vendor Identification, or Product Identification.

Therefore, by the SCSI INQUIRY command, the storage unit may be required to provide the replication identification VPD page 0xC7 to identify whether the storage unit is the primary storage unit or the secondary storage unit according to the content included therein.

Next, the identification process of the replication pair at the host system will be described in detail.

MPIO/DSM Path Grouping

When a replication destination LUN is created, several new devices will appear at the host system/MPIO, and the number of new devices depends on the number of physical paths. After the new devices are discovered, the MPIO/DSM will send a SCSI INQUIRY command for the replication identification VPD page 0xC7 to each discovered device to obtain the replication identification information. The EVPD bit is set to 1 and the page code is set to 0xC7.

When the MPIO/DSM receives the returned VPD page 0xC7,

If the page includes predetermined replication identification information, such as an all-zero descriptor or null, the queried storage unit is identified as the replication source LUN. Next, the MPIO/DSM will send an additional SCSI INQUIRY command with the EVPD bit set to 1 and the page code set to 0x83 to the queried device to obtain the device identification VPD page 0x83; the queried device will return its device identification information in the VPD page 0x83, namely, its designator (type 0x3), the designator be used by the MPIO/DSM to identify the replication source LUN to create a pseudo device/pseudo path.

If the page does not include the predetermined replication identification information, but includes the device designator, the queried storage unit is identified as the replication destination LUN. The designator returned in VPD page 0xC7 (type 0x1, defined in FIG. 3) will be used by MPIO/DSM to identify the replication destination LUN to create a pseudo device/pseudo path.

In the above manner, it is possible to receive, from the replication destination LUN, the descriptor of the replication source LUN associated therewith, thereby using the designator of the replication source LUN to associate the replication destination LUN with the replication source LUN.

Figure 13:
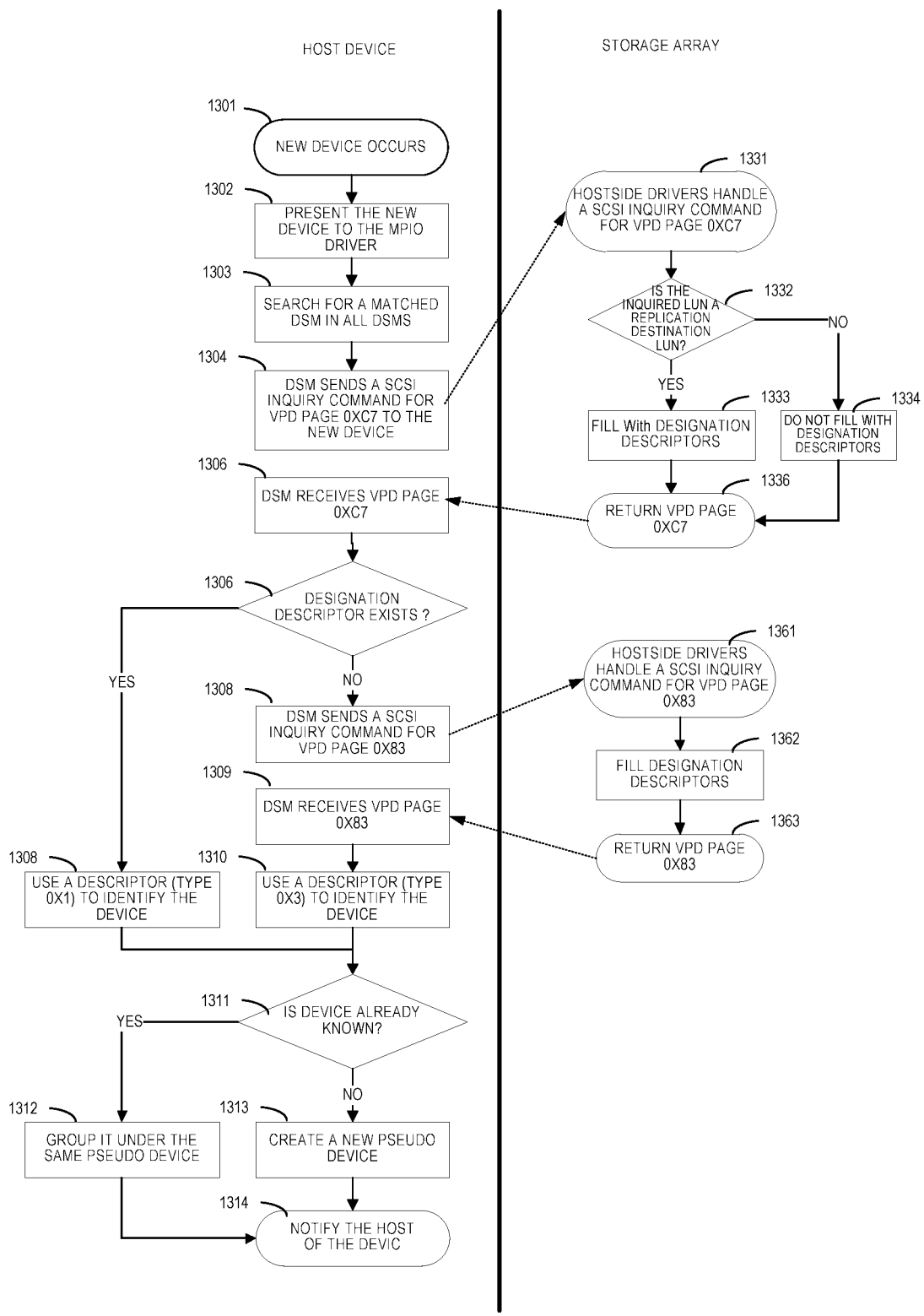
FIG. 13 illustrates a flow chart of a storage unit discovery process 1300 in accordance with a specific implementation of the present disclosure.

FIG. 13 illustrates a flow chart of a storage unit discovery process 1300 in accordance with a specific implementation of the present disclosure. As shown in FIG. 13, it is possible to, at the host system, after detecting a new device/storage unit (operation 1301), provide the MPIO with information of the new device (operation 1302), and then look up all DSMs for a DSM matched with the new device (operation 1303), the found DSM sending a SCSI INQUIRY command for VPD page 0xC7 to the new device (operation 1304).

On the storage array side, the host-side driver processes the SCSI INQUIRY command for the VPD page 0xC7 (operation 1331), and determines whether the queried LUN is the replication destination LUN (1332). If yes, a designation descriptor of the replication source LUN corresponding to the replication destination LUN is filled in the VPD page 0xC7 (operation 1333); if no, the designation descriptor is not filled (operation 1334). Then, VPD page 0xC7 is returned to the host system.

Next, on the host system side, the DSM receives the VPD page 0xC7 (operation 1305), and determines whether a designation descriptor exists in the VPD page 0xC7 (operation 1306), and if there is the designation descriptor, uses the designation descriptor (type 0x1)) to identify the new device (1307). If there is no designation descriptor, the DSM further sends a SCSI INQUIRY command for VPD page 0x83 to the device (operation 1308) to obtain the device designation descriptor for the storage unit.

On the storage array side, the SCSI INQUIRY command for VPD page 0x83 is received and processed by the host-side driver (step 1351), and it fills in its own designation descriptor in the VPD page 0x83 and returns to the VPD page 0x83.

Then, on the host system side, the DSM receives the VPD page 0x83 (operation 1309) and uses the designation descriptor (type 0x3) contained in the VPD page 0x83 to identify the new devices (operation 1310). After operations 1308 and 1310, it is possible to further determine whether the devices are known devices (operation 1311), for example determine by determining whether the designation descriptor is a known descriptor. If they are known devices, the new devices are grouped under the same pseudo device (operation 1312); if they are not known devices, a new pseudo device/pseudo path is created (operation 1313). After operations 1312 and 1313, the host system is informed of the new devices.

Figure 14:
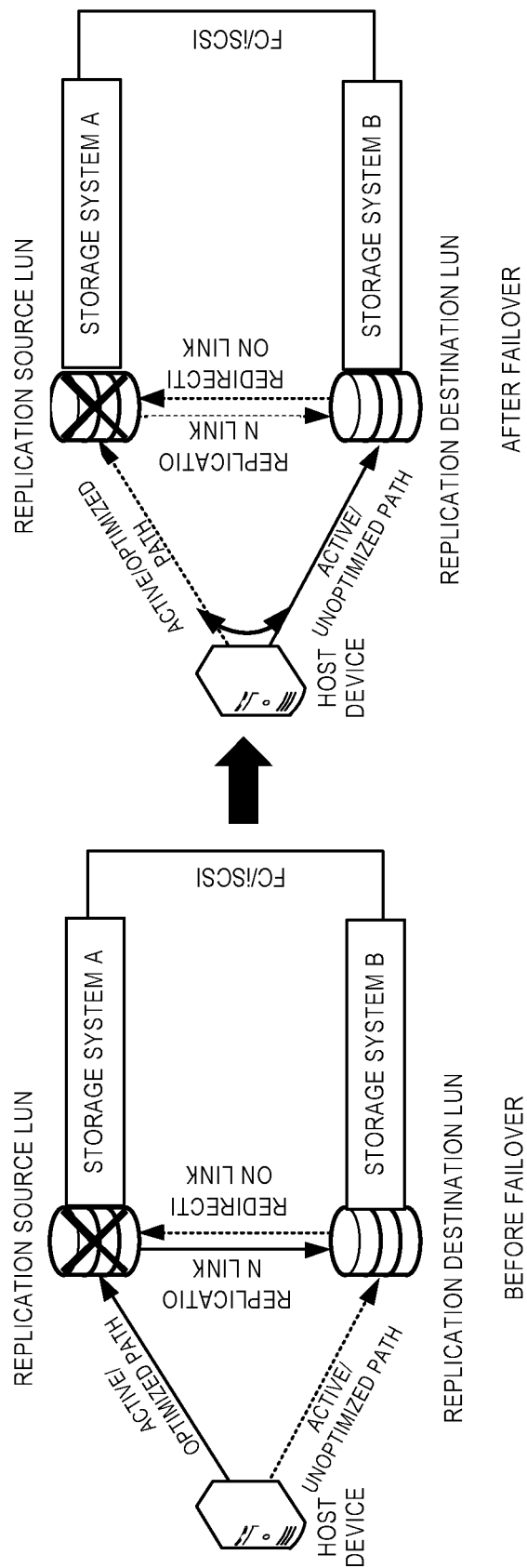
FIG. 14 illustrates a schematic diagram of automatic failover in accordance with an embodiment of the present disclosure.
Figure 15:
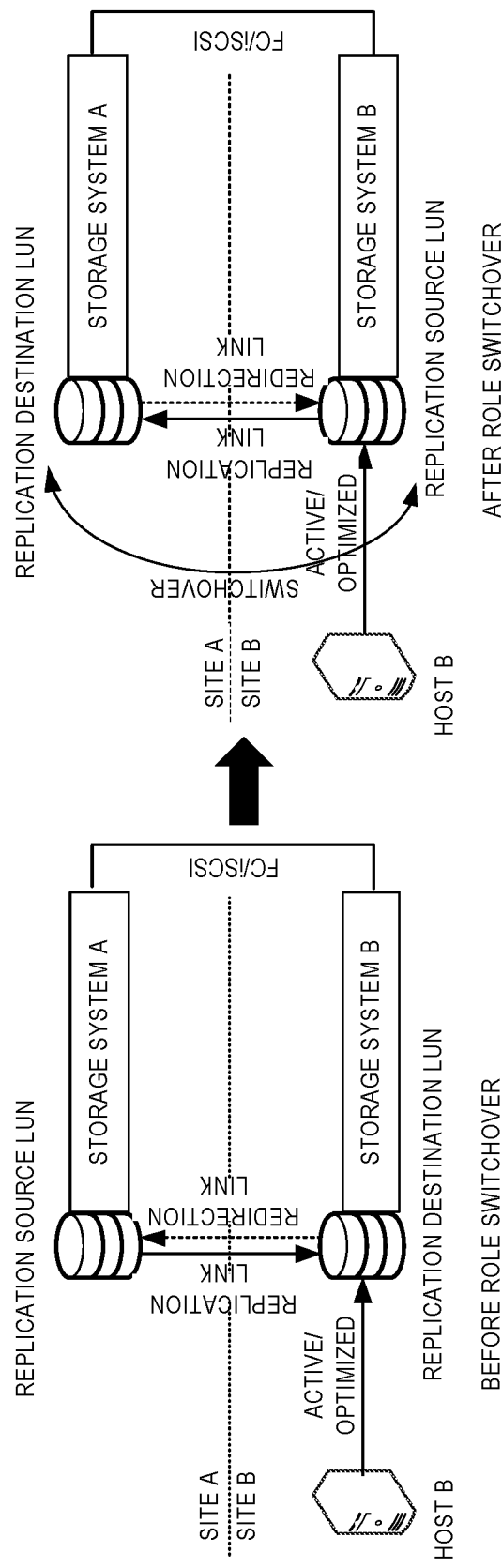
FIG. 15 illustrates a schematic diagram of automatic role switchover in accordance with an embodiment of the present disclosure.

After introducing the vendor-specific DSM and the new replication source LUN identifier reporting mechanism mentioned above, it is possible to implement the across-array replication operation and it is also possible to implement automatic failover and automatic role exchange. Reference will be made to FIG. 14 to FIG. 15 for detailed description.

Automatic Failover

In an embodiment according to the present disclosure, it is possible to, in response to detecting that another data access request cannot be processed, transmit a unit failure indication to the host system and transmit a role change indication to the first primary storage unit in the first storage system. In response to receiving the unit failure indication from the second storage unit, the host system sets the first storage unit associated with the second storage unit as a new primary storage unit. The first storage system receives the role change indication from the second storage unit, and changes the first storage unit from a secondary storage unit to a primary storage unit. As such, when another data access request from the host system for the first storage unit is subsequently received, the another data access request may be processed by the first storage unit as the primary storage unit.

FIG. 14 illustrates a schematic diagram of automatic failover according to an embodiment of the present disclosure. As shown in FIG. 14, if the replication source LUN cannot provide service due to a sudden event such as loss of a hard disk drive or a drive shelf, its host-side driver stack should still be alive. At this time, the RP splitter in the replication source LUN still replicates the received I/O request to storage system B hosting the replication destination LUN via the replication link. At the same time, upon receiving a new I/O request, storage system A rejects the I/O request to return a failure indication to the host system, for example, returning a CHECK CONDITION 0x09/0x01/0x02 (Key=VENDOR SPECIFIC, ASC=VENDOR SPECIFIC, ASCQ=REPLICATION FAILURE). The purpose of sending the CHECK CONDITION is to tell the host system that a device failure has occurred at the replication source LUN. A role change request is also sent to storage system B.

When the MPIO/DSM at the host system receives CHECK CONDITION 0x09/0x01/0x02 from storage system A, it will upgrade its path to the replication destination LUN from an "Active/Unoptimized" state to an "Active/Optimized" state, and meanwhile downgrade its path to the replication source LUN from the "Active/Optimized" state to the "Active/Unoptimized" state.

After the storage system B receives the role change request, the replication destination LUN is set as the primary storage unit. Subsequent I/O requests will be sent to the replication destination LUN via the optimized path between the host system and the original replication destination LUN, and the replication destination LUN pair will process the I/O request without forwarding the I/O request to the failed replication source LUN.

In this way, automatic failover may be performed in the event of a failure without manual intervention.

Automatic Role Switchever

In an embodiment according to the present disclosure, the primary storage unit monitors a data access request forwarded by the first storage system; and in response to the forwarded data access request meeting a predetermined role switchover threshold, changes the second storage unit from the primary storage unit to the secondary storage unit; and sends a role switchover indication to the first storage unit in the first storage system. Receive a role switchover indication from the another storage unit from the storage unit; change the storage unit from the secondary storage unit to the primary storage unit; and responsive to receiving another data access request which is from the host system and for the storage unit, the storage unit as the primary storage unit processes the another data access request. As such, role switchover may be performed on its own without the access of the host system.

FIG. 15 illustrates a schematic diagram of automatic role switchover in according to an embodiment of the present disclosure. As shown in FIG. 15, storage system A is located at location A, while host B and storage system B are located at location B. Host B can only access storage system B without any physical connection to storage system A. Initially, all I/O requests are sent to the replication destination LUN within storage system B along the active/optimized path between host B and the replication destination LUN, and then sent by the replication destination LUN via the redirection link to the replication source LUN in storage system A. The replication source LUN then replicates the I/O request back to the replication destination LUN within storage system B. If the replication destination LUN always forwards, this will cause a lot of unnecessary replication.

Since under normal circumstances, the replication source LUN can receive both direct I/O requests from Host B and redirected I/O request forwarded by the replication destination LUN. Therefore, it is possible that the replication source LUN be responsible for gathering I/O statistics to make role switchover decisions. For example, the replication source LUN may keep one counter for direct I/O requests from the host system, and keep another counter for redirected I/O requests from the replication destination. For example, if the proportion of redirected I/O requests exceeds a predetermined role switchover threshold, it is possible to decide to automatically switch over roles between the replication source LUN and the replication destination LUN. That is, the original replication source LUN becomes the replication destination LUN, and the original replication destination LUN becomes the replication source LUN. Upon receiving a subsequent data access request from the host system, the original replication destination LUN will act as the primary storage unit to process the I/O request.

As such, for the case shown in FIG. 15, after the role switchover is performed, the original replication destination LUN will act as the primary storage unit to process the I/O request, without need to redirect a number of I/O requests, thereby substantially improving the efficiency of processing I/O requests.

In addition, it should be appreciated that FIG. 15 is merely an example scenario, and in other cases, a scenario requiring automatic role switchover may occur.

Figure 16:
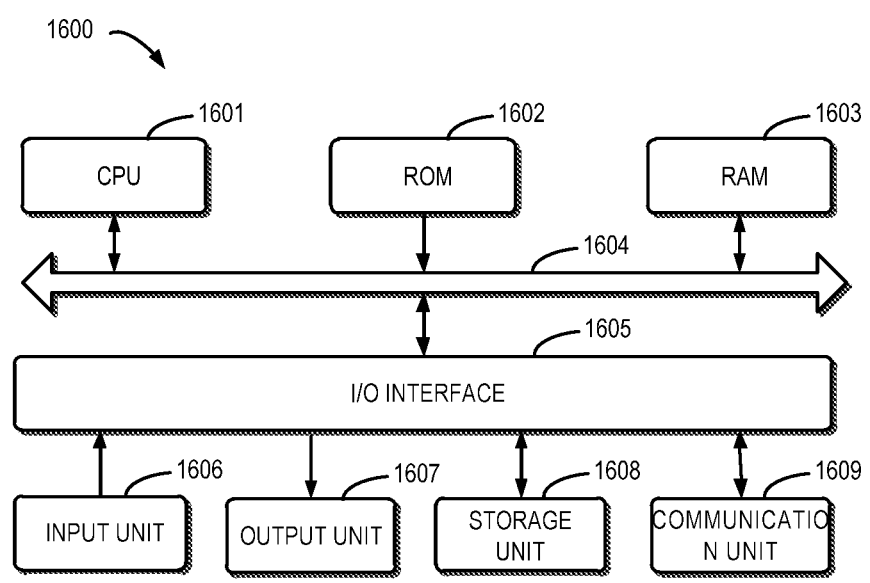
FIG. 16 illustrates a schematic block diagram of an example device 1600 that may be used to implement embodiments of the present disclosure.

In addition, FIG. 16 illustrates a schematic block diagram of an example device 1600 that may be used to implement embodiments of the present disclosure. The device 1600 may be used to implement one or more control modules of a storage controller 110 of FIG. 1.

As shown, the device 1600 includes a central processing unit (CPU) 1601 which is capable of performing various processes in accordance with computer program instructions stored in a read only memory (ROM) 1602 or computer program instructions loaded from a storage unit 1608 to a random access memory (RAM) 1603. In the RAM 1603 are stored various programs and data as required by operation of the device 1600. The CPU 1610, the ROM 1602 and the RAM 1603 are connected to one another via a bus 1604. An input/output (I/O) interface 1605 is also connected to the bus 1604.

The following components in the device 1600 are connected to the I/O interface 1605: an input unit 1606 including a keyboard, a mouse, or the like; an output unit 1607 such as various types of displays and speakers; a storage unit 1608 such as a magnetic disk or optical disk; and a communication unit 1609 such as a network card, a modem, a wireless communication transceiver or the like. The communication unit 1609 allows the device 1600 to exchange information/data with other devices via a computer network such as the Internet and/or various telecommunication networks.

The processing unit 1601 performs various method and processes described above, for example any one of method 400, method 500, method 600, method 900, method 1000, method 1100 and method 1300, for example, in some embodiments, any one of method 400, method 500, method 600, method 900, method 1000, method 1100 and method 1300 may be implemented as a computer software program or computer program product, which is tangibly contained in a machine-readable medium, for example the storage unit 1608. In some embodiments, part or all of the computer program may be loaded and/or installed on the device 1600 via ROM 1602 and/or communication unit 1609. When the computer program is loaded in the RANI 1603 and executed by CPU 1601, one or more acts of any one of method 400, method 500, method 600, method 900, method 1000, method 1100 and method 1300 described above may be executed. Alternatively, in other embodiments, the CPU 1601 may be configured to perform any one of method 400, method 500, method 600, method 900, method 1000, method 1100 and method 1300 in any other suitable manner (e.g., by means of firmware).

It will be understood by those skilled in the art that various steps of the above-described methods of the present disclosure may be implemented by a general-purpose computing device, and they may be centralized on a single computing device or distributed over a network of multiple computing devices. Alternatively, they may be implemented by a program code executable by the computing device so that they may be stored in the storage device and executed by the computing device, or they may be fabricated into individual integrated circuit modules, or multiple modules or steps therein are fabricated into a single integrated circuit module. Thus, the present disclosure is not limited to any specific combination of hardware and software.

It should be appreciated that although several means or sub-means (e.g., specialized circuitry) of the device are mentioned in the above detailed description, such division is merely by way of example and not mandatory. In fact, according to embodiments of the present disclosure, features and functions of two or more means described above may be embodied in one means. Conversely, the feature and function of one means described above may be further divided and embodied by multiple means.

What are described above are only optional embodiments of the present disclosure, and are not intended to limit the present disclosure, and those skilled in the art appreciate that various changes and modifications may be made to the present disclosure. Any modifications, equivalent substitutions, improvements, etc., made within the spirit and scope of the present disclosure, are intended to be included within the scope of the present disclosure.

We claim:

1. A method for processing a storage unit access in a first storage system, comprising:
   receiving a data access request which is from a host system and for a first storage unit in the first storage system, wherein the first storage unit is a secondary storage unit, and wherein the first storage unit is a replication destination storage unit;
   the data access request being redirected without being processed by the first storage unit to a second storage unit in a second storage system associated with the first storage unit via a redirection link from the first storage system to the second storage system, wherein the second storage unit is a primary storage unit, and wherein the second storage unit is a replication source storage unit; and
   after the data access request is redirected to the second storage unit in the second storage system via the redirection link and processed by the second storage unit, replicating the data access request back to the first storage unit in the first storage system via a replication link from the second storage system to the first storage system that is separate from the redirection link from the first storage system to the second storage system.

2. The method according to claim 1, further comprising:
   receiving an acknowledgment which is from the second storage unit and for the data access request;
   the confirmation for the data access request being forwarded to the host system.

3. The method according to claim 2, further comprising:
   receiving a replication identification information acquisition request which is from the host system and for the first storage unit;
   sending a response to the replication identification information acquisition request to the host system, wherein the response indicates that the first storage unit is a secondary storage unit.

4. The method according to claim 3, further comprising:
   determining whether the first storage unit is a primary storage unit or a secondary storage unit;
   sending the response to the host system in response to determining that the first storage unit is the secondary storage unit.

5. The method according to claim 3, wherein the response comprises device identification information of the second storage unit associated with the first storage unit.

6. The method according to claim 1, further comprising:
   receiving a role change indication from the second storage unit in the second storage system;
   changing the first storage unit from a secondary storage unit to a primary storage unit;
   in response to receiving another data access request which is from the host system and for the first storage unit, the first storage unit as the primary storage unit processes the another data access request.

7. The method according to claim 1, further comprising:
   receiving a role exchange indication from the second storage unit in the second storage system;
   changing the first storage unit from a secondary storage unit to a primary storage unit;
   in response to receiving another data access request which is from the host system and for the first storage unit, the first storage unit as the primary storage unit processes the another data access request.

8. A method for processing a data access request in a second storage system, comprising:
   receiving a data access request redirected by a first storage system without being processed by a first storage unit in the first storage system via a redirection link from the first storage system to the second storage system, wherein the data access request is for a first storage unit in the first storage system, wherein the first storage unit is a secondary storage unit, wherein the first storage unit is a replication destination storage unit, and wherein the second storage unit is a replication source storage unit;
   the data access request being processed by a second storage unit in the second storage system associated with the first storage unit, the second storage unit being a primary storage unit; and
   after the data access request is redirected to the second storage unit in the second storage system via the redirection link and processed by the second storage unit, replicating the data access request back to the first storage unit in the first storage system via a replication link from the second storage system to the first storage system that is separate from the redirection link from the first storage system to the second storage system.

9. The method according to claim 8, further comprising:
   sending an acknowledgment for the data access request to the first storage unit in the first storage system.

10. The method according to claim 9, further comprising:
    receiving a replication identification information acquisition request which is from the host system and for the second storage unit;

sending a response to the replication identification information acquisition request to the host system, wherein the response indicates that the second storage unit is a primary storage unit.

11. The method according to claim 10, further comprising:
determining whether the second storage unit is a primary storage unit or a secondary storage unit;
sending the response to the host system in response to determining that the second storage unit is a primary storage unit.

12. The method according to claim 10, wherein the response comprises predetermined replication identification information, the predetermined replication identification information indicating that the second storage unit is a primary storage unit.

13. The method according to claim 10, further comprising:
receiving a device identification information acquisition request from the host system; and
sending the host system a response containing device identification information for the second storage unit.

14. The method according to claim 8, further comprising:
sending a unit failure indication to the host system in response to detecting that another data access request cannot be processed;
sending a role change indication to the first primary storage unit in the first storage system.

15. The method according to claim 8, further comprising:
monitoring the data access request redirected by the first storage system; and
responsive to the redirected data access request meeting a predetermined role switchover threshold:
changing the second storage unit from a primary storage unit to a secondary storage unit, and
sending a role switchover indication to the first storage unit in the first storage system.

16. The method according to claim 15, further comprising:
gathering I/O statistics to make role switchover decisions in the second storage unit; and
wherein the I/O statistics to make role switchover decisions comprise a first counter counting I/O requests received by the second storage system from the host system and a second counter counting I/O requests redirected to the second storage system by the first storage system.

17. The method according to claim 16, wherein the predetermined role switchover threshold is met when a proportion of the I/O requests redirected to the second storage system by the first storage system to the number of I/O requests received by the second storage system from the host system exceeds the predetermined role switchover threshold.

18. A method for managing a storage unit access, comprising:
transmitting a data access request to a first storage unit in a first storage system, wherein the first storage unit is a secondary storage unit, and wherein the first storage unit is a replication destination storage unit, and wherein the data access request is redirected without being processed by the first storage unit to a second storage unit in a second storage system associated with the first storage unit via a redirection link from the first storage system to the second storage system, the second storage unit being a primary storage unit, and wherein the second storage unit is a replication source storage unit;
after the data access request is redirected to the second storage unit in the second storage system via the redirection link and processed by the second storage unit, replicating the data access request back to the first storage unit in the first storage system via a replication link from the second storage system to the first storage system that is separate from the redirection link from the first storage system to the second storage system; and
receiving an acknowledgment for the data access request from the first storage system.

19. The method according to claim 18, further comprising:
responsive to detecting at least one storage unit in the first storage unit and the second storage unit;
sending a replication identification information acquisition request to the at least one storage unit;
receiving a corresponding response to the replication information acquisition request from the at least one storage unit; and
identifying whether a corresponding storage unit of the at least one storage unit is a primary storage unit or a secondary storage unit based on the corresponding response.

20. The method according to claim 19, wherein the identifying whether the at least one storage unit is a primary storage unit or a secondary storage unit based on the corresponding response comprises:
determining whether the corresponding response includes predetermined replication identification information, wherein the predetermined replication identification information indicates that the corresponding storage unit is a primary storage unit.

21. The method according to claim 19, further comprising:
in response to identifying that the corresponding storage unit is a secondary storage unit, associating device identification information included in the response with the corresponding storage unit.

22. The method according to claim 19, further comprising:
responding to identifying that the corresponding storage unit is a primary storage unit, transmitting a device identification information acquisition request to the corresponding storage unit;
receiving a response containing device identification information from the corresponding storage unit.

23. The method according to claim 22, further comprising:
determining whether the device identification information indicates a known storage unit;
in response to determining that the device identification information indicates a known storage unit, associating the corresponding storage unit with the known storage unit information corresponding to the device identification information;
in response to determining that the device identification information does not indicate a known storage unit, establishing new storage unit information.

24. The method according to claim 22, further comprising:

in response to receiving a unit failure indication from the second storage unit, setting the first storage unit associated with the second storage unit as a new primary storage unit.

25. An apparatus for processing a storage unit access in a first storage system, comprising:

a processor; and a memory coupled to the processor, the memory having instructions stored therein, the instructions, when executed by the processor, causing the apparatus to:

receive a data access request which is from a host system and for a first storage unit in the first storage system, wherein the first storage unit is a secondary storage unit, and wherein the first storage unit is a replication destination storage unit, the data access request being redirected without being processed by the first storage unit to a second storage unit in a second storage system associated with the first storage unit via a redirection link from the first storage system to the second storage system, wherein the second storage unit is a primary storage unit, and wherein the second storage unit is a replication source storage unit, and after the data access request is redirected to the second storage unit in the second storage system via the redirection link and processed by the second storage unit, the data access request being replicated back to the first storage unit in the first storage system via a replication link from the second storage system to the first storage system that is separate from the redirection link from the first storage system to the second storage system.

26. An apparatus for processing a storage unit access in a second storage system, comprising:

a processor; and a memory coupled to the processor, the memory having instructions stored therein, the instructions, when executed by the processor, causing the apparatus to:

receive a data access request redirected by a first storage system via a redirection link from the first storage system to the second storage system, the data access request having not been processed by the first storage unit, wherein the data access request is for a first storage unit in the first storage system, wherein the first storage unit is a secondary storage unit, wherein the first storage unit is a replication destination storage unit, and wherein the second storage unit is a replication source storage unit, the data access request being processed by a second storage unit in the second storage system associated with the first storage unit, the second storage unit being a primary storage unit, and after the data access request is redirected to the second storage unit in the second storage system via the redirection link and processed by the second storage unit, the data access request being replicated back to the first storage unit in the first storage system via a replication link from the second storage system to the first storage system that is separate from the redirection link from the first storage system to the second storage system.

27. An apparatus for managing a storage unit access, comprising:

a processor; and a memory coupled to the processor, the memory having instructions stored therein, the instructions, when executed by the processor, causing the apparatus to:

transmit a data access request to a first storage unit in a first storage system, wherein the first storage unit is a secondary storage unit, and wherein the first storage unit is a replication destination storage unit, and wherein the data access request is redirected without being processed by the first storage unit to a second storage unit in a second storage system associated with the first storage unit via a redirection link from the first storage system to the second storage system, the second storage unit being a primary storage unit, and wherein the second storage unit is a replication source storage unit, after the data access request is redirected to the second storage unit in the second storage system via the redirection link and processed by the second storage unit, the data access request being replicated back to the first storage unit in the first storage system via a replication link from the second storage system to the first storage system that is separate from the redirection link from the first storage system to the second storage system, and receive an acknowledgment for the data access request from the first storage system.

28. A computer program product having a non-transitory computer readable medium which stores a set of instructions to process a storage unit access in a first storage system; the set of instructions, when carried out by computerized circuitry, causing the computerized circuitry to perform a method of:

receiving a data access request which is from a host system and for a first storage unit in the first storage system, wherein the first storage unit is a secondary storage unit, and wherein the first storage unit is a replication destination storage unit;

the data access request being redirected without being processed by the first storage unit to a second storage unit in a second storage system associated with the first storage unit via a redirection link from the first storage system to the second storage system, wherein the second storage unit is a primary storage unit, and wherein the second storage unit is a replication source storage unit; and after the data access request is redirected to the second storage unit in the second storage system via the redirection link and processed by the second storage unit, replicating the data access request back to the first storage unit in the first storage system via a replication link from the second storage system to the first storage system that is separate from the redirection link from the first storage system to the second storage system.

29. A computer program product having a non-transitory computer readable medium which stores a set of instructions to process a data access request in a second storage system; the set of instructions, when carried out by computerized circuitry, causing the computerized circuitry to perform a method of:

receiving a data access request redirected by a first storage system via a redirection link from the first storage system to the second storage system, the data access request having not been processed by the first storage unit, wherein the data access request is for a first storage unit in the first storage system, wherein the first storage unit is a secondary storage unit, wherein the first storage unit is a replication destination storage unit, and wherein the second storage unit is a replication source storage unit;

the data access request being processed by a second storage unit in the second storage system associated with the first storage unit, the second storage unit being a primary storage unit; and after the data access request is redirected to the second storage unit in the second storage system via the redirection link and processed by the second storage unit, replicating the data access request back to the first storage unit in the first storage system via a replication link from the second storage system to the first storage system that is separate from the redirection link from the first sto qe system to the second storage system.

30. A computer program product having a non-transitory computer readable medium which stores a set of instructions to manage a storage unit access; the set of instructions, when carried out by computerized circuitry, causing the computerized circuitry to perform a method of:

transmitting a data access request to a first storage unit in a first storage system, wherein the first storage unit is a secondary storage unit, and wherein the first storage unit is a replication destination storage unit, and wherein the data access request is redirected without being processed by the first storage unit to a second storage unit in a second storage system associated with the first storage unit via a redirection link from the first storage system to the second storage system, the second storage unit being a primary storage unit, and wherein the second storage unit is a replication source storage unit;

after the data access request is redirected to the second storage unit in the second storage system via the redirection link and processed by the second storage unit, redirecting the data access request back to the first storage unit in the first storage system via a replication link from the second storage system to the first storage system that is separate from the redirection link from the first storage system to the second storage system; and receiving an acknowledgment for the data access request from the first storage system.

\* \* \* \* \*